US012563439B2

(12) United States Patent
  Gomadam et al.

(10) Patent No.: US 12,563,439 B2
(45) Date of Patent: Feb. 24, 2026

(54) END-TO-END Wi-Fi OPTIMIZATION

(71) Applicant: Meta Platforms, Inc., Menlo Park, CA (US)

(72) Inventors: Krishna Srikanth Gomadam, San Jose, CA (US); Enis Akay, New Albany, OH (US); Sundeep Singatwaria, Fremont, CA (US); Djordje Tujkovic, Los Altos, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 298 days.

(21) Appl. No.: 18/240,663

(22) Filed: Aug. 31, 2023

(65) Prior Publication Data

US 2024/0080706 A1     Mar. 7, 2024

Related U.S. Application Data

(60) Provisional application No. 63/403,208, filed on Sep. 1, 2022.

(51) Int. Cl.
  *H04W 28/02*     (2009.01)
  *H04W 84/12*     (2009.01)

(52) U.S. Cl.
  CPC ........ *H04W 28/0268* (2013.01); *H04W 84/12* (2013.01)

(58) Field of Classification Search
  CPC .......................... H04W 28/0268; H04W 84/12
  See application file for complete search history.

(56) References Cited

U.S. PATENT DOCUMENTS

| | | | | |
|---|---|---|---|---|
| 10,356,574 | B1 * | 7/2019 | Wood ..................... | H04W 4/021 |
| 2016/0065419 | A1 * | 3/2016 | Szilagyi .............. | G06F 11/3006 |
| | | | | 709/224 |
| 2018/0359189 | A1 * | 12/2018 | Ye ......................... | H04N 23/698 |

FOREIGN PATENT DOCUMENTS

| | | | | | |
|---|---|---|---|---|---|
| GB | 2622987 A | * | 4/2024 | ............. | H04L 47/24 |

* cited by examiner

*Primary Examiner* — Mohammad S Anwar
(74) *Attorney, Agent, or Firm* — EVERSHEDS SUTHERLAND (US) LLP

(57) ABSTRACT

In the present application, a method of optimizing the delivery of Wi-Fi data is disclosed. A packet associated with a Wi-Fi network is received. The packet is determined as being associated with a virtual reality or an augmented reality application. A priority of the packet is determined based on a quality-of-service specification associated with the virtual reality or the augmented reality application. The handling of the packet is prioritized based on the determined priority.

17 Claims, 8 Drawing Sheets

500

502
Receive a packet associated with a Wi-Fi network

504
Determine the packet as being associated with a virtual reality or an augmented reality application 506
Determine a priority of the packet based on a quality-of-service (QoS) specification associated with the virtual reality or the augmented reality application 508
Prioritize the handling of the packet based on the determined priority

600

602

Receive performance metrics or statistics

604

Do performance metrics meet the performance requirements?

Yes

No

606

Optimize the parameters to improve the performance metrics

END-TO-END Wi-Fi OPTIMIZATION

CROSS REFERENCE TO OTHER APPLICATIONS

This application claims priority to U.S. Provisional Patent Application No. 63/403,208 entitled END TO END WI-FI OPTIMIZATION filed Sep. 1, 2022 which is incorporated herein by reference for all purposes.

BACKGROUND OF THE DISCLOSURE

In computer networking, an access point (AP) is a networking hardware device that allows Wi-Fi devices to connect to a wired network. An access point connects directly to a wired local area network, typically Ethernet, and the access point then provides wireless connections using wireless LAN technology, typically Wi-Fi, for other devices to use that wired connection. Access points support the connection of multiple wireless devices through their one wired connection. Multiple access points can be deployed in an organization, and users roaming with their mobile devices are handed off from one access point to another.

FIG. 1 illustrates an exemplary business network 100. As shown, business network 100 is a local area network (LAN), including one or more wireless local area networks (wireless LANs) and a wired local area network (wired LAN). Access point 102A creates the first wireless LAN 103A, and access point 102B creates a second wireless LAN 103B. Wi-Fi devices 104, 106, and 108 are connected to access point 102A via wireless LAN 103A. Wi-Fi devices 110, 112, and 114 are connected to access point 102B via wireless LAN 103B. Wi-Fi devices may include laptop computers, smartphones, tablets, printers, video streaming devices, gaming consoles, home automation devices, security cameras, speakers, stereo systems, and the like.

Access point 102A connects directly to a wired local area network 123 via an Ethernet switch 116. Similarly, access point 102B connects directly to wired local area network 123 via Ethernet switch 116. Different devices 118, 120, and 122 are connected to Ethernet switch 116 via the wired LAN 123. Devices 118, 120, and 122 may include computers, workstations, printers, servers, and the like.

Ethernet switch 116 connects to a router 124. Router 124 is further connected to Internet 128 via a device 126. Device 126 may be a cable modem or a Digital Subscriber Loop (DSL) modem. Device 126 may also be an Optical Network Terminal (ONT) for providing a Fiber Optic Service (FiOS). Device 126 may be a Channel Service Unit (CSU) or a Data Service Unit (DSU).

BRIEF DESCRIPTION OF THE DRAWINGS

Various embodiments of the disclosure are disclosed in the following detailed description and the accompanying drawings.

DETAILED DESCRIPTION

The disclosure can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the disclosure may take, may be referred to as techniques. In general, the order of the steps of disclosed processes may be altered within the scope of the disclosure. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the disclosure is provided below along with accompanying figures that illustrate the principles of the disclosure. The disclosure is described in connection with such embodiments, but the disclosure is not limited to any embodiment. The scope of the disclosure is limited only by the claims and the disclosure encompasses numerous alternatives, modifications and equivalents. Numerous specific details are set forth in the following description in order to provide a thorough understanding of the disclosure. These details are provided for the purpose of example and the disclosure may be practiced according to the claims without some or all of these specific details. For the purpose of clarity, technical material that is known in the technical fields related to the disclosure has not been described in detail so that the disclosure is not unnecessarily obscured.

Figure 1:
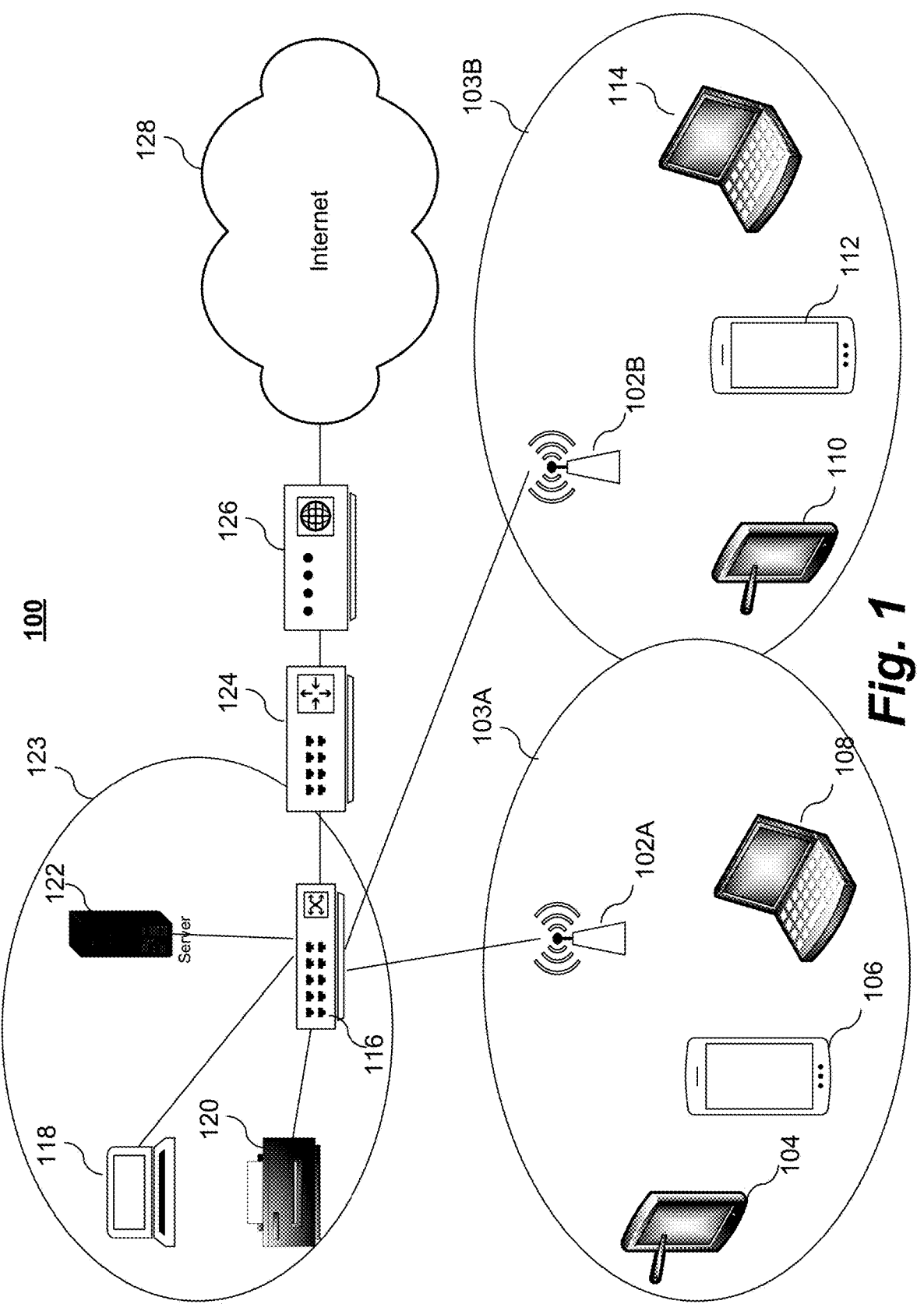
FIG. 1 illustrates an exemplary business network 100.
Figure 2:
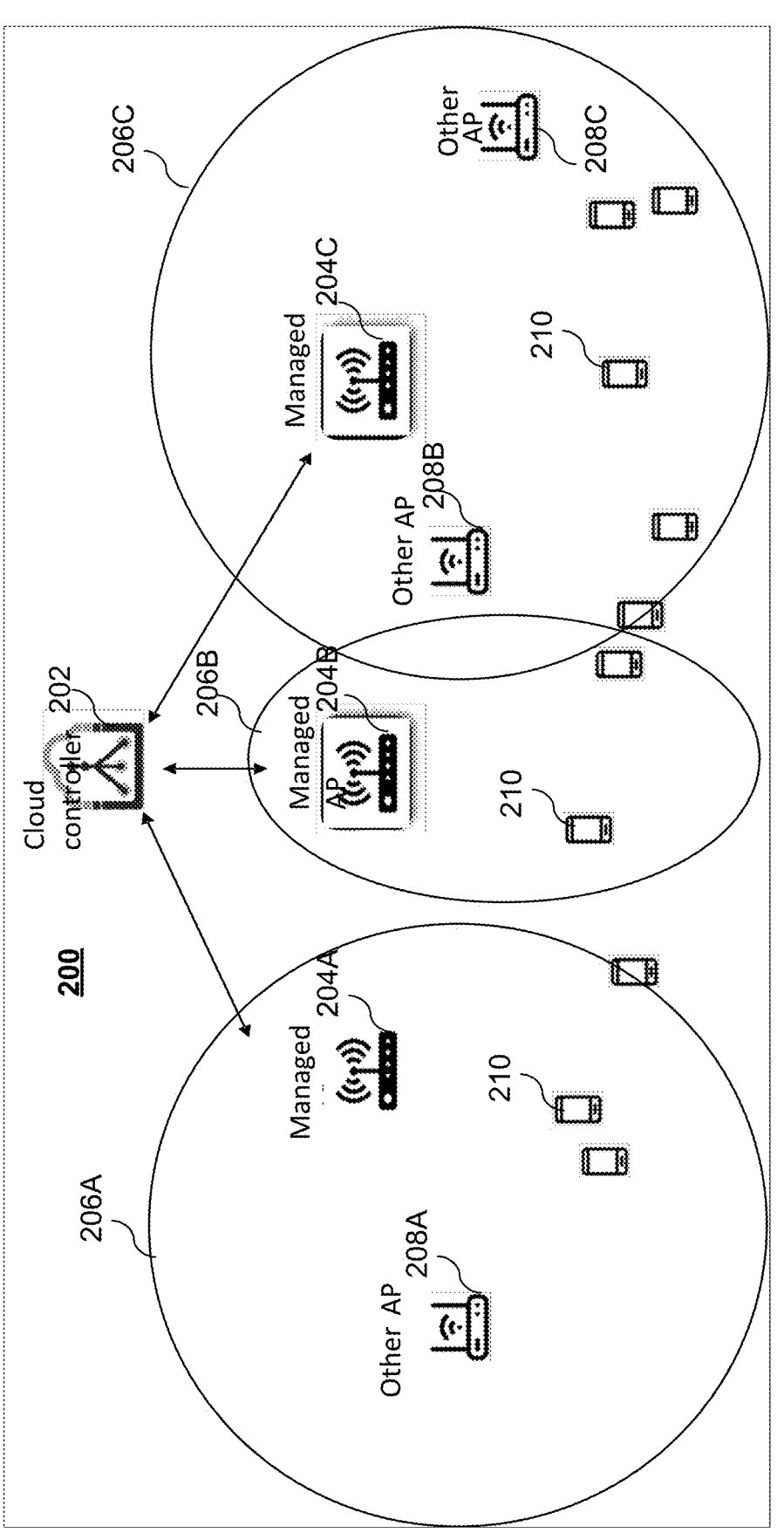
FIG. 2 illustrates an example of a traditional Wi-Fi optimization system 200.

FIG. 2 illustrates an example of a traditional Wi-Fi optimization system 200. System 200 includes a cloud controller 202 for managing a plurality of access points, each located in a different network. In some embodiments, cloud controller 202 is configured to control a managed access point 204A in network 206A, a managed access point 204B in network 206B, and a managed access point 204C in network 206C. In some of the networks, there may be additional access points that are not managed by the cloud controller. For example, as shown in FIG. 2, network 206A has one other access point 208A, and network 206C has two other access points 208B and 208C. Wi-Fi devices 210 are connected to one of the access points. Wi-Fi devices 210 may include laptop computers, smartphones, tablets, printers, video streaming devices, gaming consoles, home automation devices, security cameras, speakers, stereo systems, and the like.

As shown in FIG. 2, users may roam with their Wi-Fi devices 210 and they may be handed off from one access point to another. When several users and adjacent access points share the same frequency channel, it may not be possible to achieve the maximum channel capacity. Radio resource management is especially important in systems limited by co-channel interference rather than by noise, for example, wireless networks including many adjacent access points that may reuse the same channel frequencies.

Radio resource management (RRM) is the system level management of co-channel interference, radio resources, and other radio transmission characteristics in wireless communication systems, including wireless local area networks. Radio resource management involves strategies and algorithms for controlling parameters such as transmit power, user allocation, channel assignments, bandwidth assignments, beamforming, data rates, handover criteria, modulation schemes, error coding schemes, and the like. The objective is to utilize the limited radio-frequency spectrum resources and radio network infrastructure as efficiently as possible to optimize the network performance, including increasing the data rate, reducing the interference, etc.

Using radio resource management, the radio frequency (RF) environment is being monitored. For example, cloud controller 202 may collect information of the RF environment and make changes to the access point channels and power levels to reduce noise, interference from other devices, coverage gaps, and co-channel interference caused by the network.

However, traditional systems, such as Wi-Fi optimization system 200, have a number of limitations. For example, some do not consider any requirements that are application specific. Some do not consider any end-to-end requirements, including end-to-end requirements that are application specific. The systems may try to optimize the network performance for all Wi-Fi devices. However, they do not consider the specific requirements of the applications that are running on the Wi-Fi devices. For example, a Wi-Fi device that is running an application that has more demanding and stringent requirements may be treated the same by the system as another Wi-Fi device that is not running such an application.

Some traditional systems may be configured to optimize certain types of Wi-Fi devices that are specifically designed for certain applications. For example, some traditional systems may be configured to optimize gaming devices or voice over internal protocol (VoIP) devices. However, these specific devices may also run other applications, and these traditional systems cannot distinguish the different types of traffic to and from these specific devices, thereby treating all the traffic to or from these devices the same way. For example, these traditional systems may treat the gaming packets from a gaming device with the same priority as other packets from the same gaming device, such as packets for web browsing. In other words, these existing systems merely optimize for specific devices rather than specific applications.

These limitations may be particularly problematic for certain applications that have more demanding and stringent performance requirements or constraints. One example of such applications includes metaverse applications. The metaverse is a set of digital spaces, including 3D spaces, to work, play, learn, collaborate, create, shop, or interact with friends in a virtual, online environment. The metaverse is a digital reality that combines aspects of social media, online gaming, augmented reality (AR), virtual reality (VR), and cryptocurrencies to allow users to interact virtually. Augmented reality involves overlaying visual elements, sound, and other sensory stimuli onto a real-world setting to enhance the user experience. AR can be accessed with a smartphone, and users can control their presence in the real world. In comparison, virtual reality is completely virtual and enhances fictional realities. VR requires a headset device, and users are controlled by the system.

Different metaverse applications may have different end-to-end performance requirements. The end-to-end performance requirements may be quality-of-service (QoS) specifications, and end-to-end service level indicators (SLIs) or key performance indicators (KPIs) may be used to evaluate whether the performance requirements are met. A KPI is a metric, usually in the form of a counter or gauge value. The metric helps convey the health/status, performance, or usage of a given component or a set of related components. A service level indicator (SLI) is a metric that indicates what measure of performance a customer is receiving at a given time. SLIs are widely used by software development and operations (DevOps) engineers to discuss the quality of service (QoS) and create shared goals to promote reliability within a system. Common SLIs include latency, throughput, jitter, availability, and error rate; others include durability and correctness. For example, metaverse applications that require a high level of SLI include virtual reality online video games or cloud VR. Their minimum performance thresholds may include a goodput of 25 Mbps and an edge to device round-trip time (RTT) of 25 milliseconds (ms). Metaverse applications that require a medium level of SLI include cloud gaming and streaming applications. Their minimum performance thresholds may include a goodput of 10 Mbps and an edge to device round-trip time (RTT) of 50 ms. Metaverse applications that require a low level of SLI include video and VoIP. Their minimum performance thresholds may include a goodput of 5 Mbps and an edge to device round-trip time (RTT) of 125 ms. Metaverse applications may have different required SLIs/KPIs for uplink and downlink. Uplink is the traffic that a Wi-Fi device sends to the network, and downlink is the traffic that the Wi-Fi device receives from the network. A network that is capable of supporting metaverse applications should consistently deliver these minimum performance thresholds.

In the present application, a method of optimizing the delivery of Wi-Fi data is disclosed. A packet associated with a Wi-Fi network is received. The packet is determined as being associated with a virtual reality or an augmented reality application. A priority of the packet is determined based on a quality-of-service specification associated with the virtual reality or the augmented reality application. The handling of the packet is prioritized based on the determined priority.

A system of optimizing the delivery of Wi-Fi data is disclosed. The system comprises a processor. The processor is configured to receive a packet associated with a Wi-Fi network. The processor is configured to determine that the packet is associated with a virtual reality or an augmented reality application. The processor is configured to determine a priority of the packet based on a quality-of-service (QoS) specification associated with the virtual reality or augmented reality application. The processor is configured to prioritize handling of the packet based on the determined priority. The system comprises a memory coupled to the processor and configured to provide the processor with instructions.

A computer program product for optimizing the delivery of Wi-Fi data is disclosed. The computer program product is embodied in a non-transitory computer readable medium and comprises computer instructions for receiving a packet associated with a Wi-Fi network. The computer program product comprises computer instructions for determining that the packet is associated with a virtual reality or an augmented reality application. The computer program product comprises computer instructions for determining a priority of the packet based on a quality-of-service (QoS) specification associated with the virtual reality or augmented reality application. The computer program product comprises computer instructions for prioritizing handling of the packet based on the determined priority.

Figure 3:
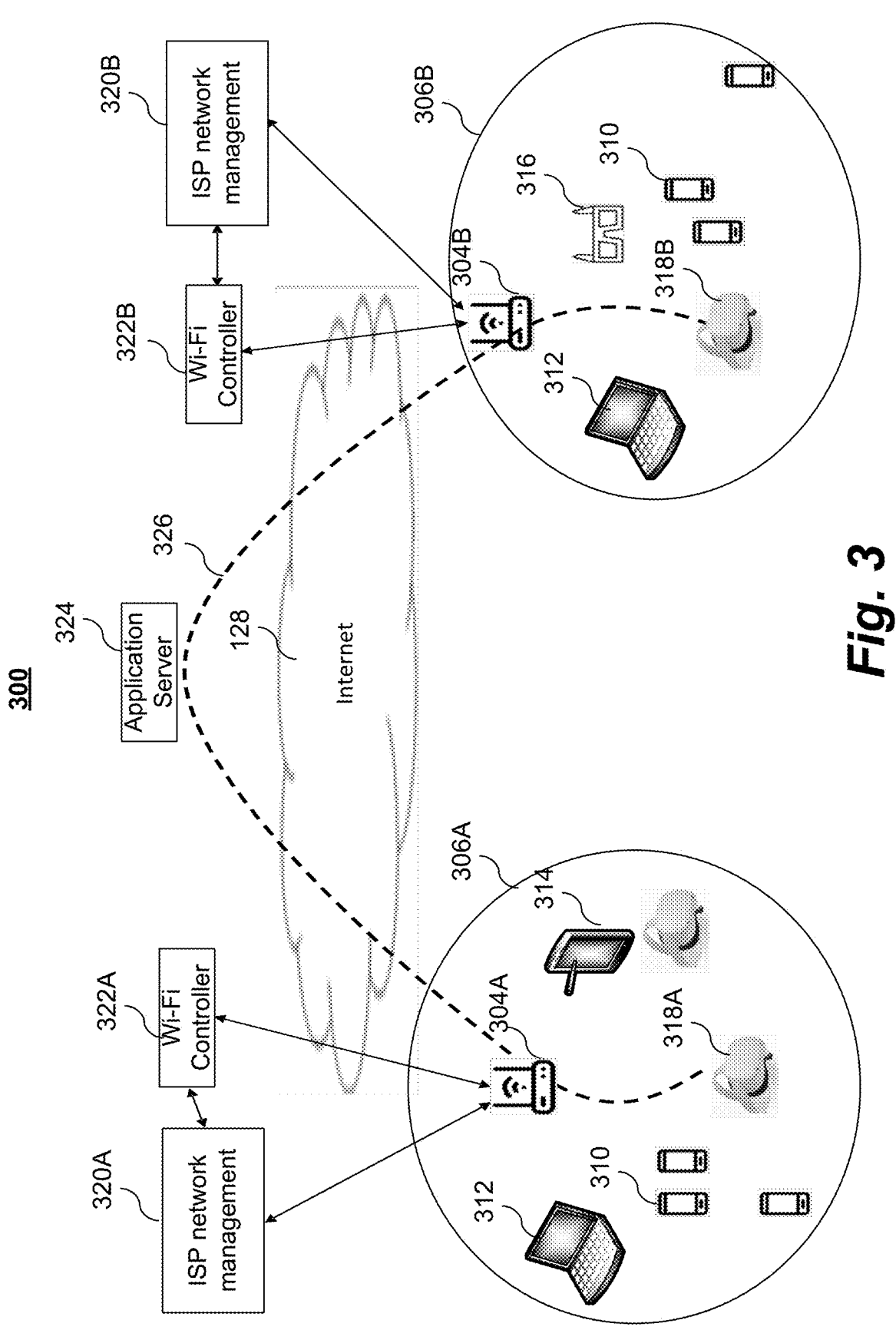
FIG. 3 illustrates another example of an improved Wi-Fi optimization system 300 for delivering data of Wi-Fi devices running applications that have more stringent performance requirements.

FIG. 3 illustrates another example of an improved Wi-Fi optimization system 300 for delivering data of Wi-Fi devices running applications that have more stringent performance requirements. A plurality of managed access points (304A and 304B) are deployed in the system. A managed access point 304A is deployed in network 306A, and a managed access point 304B is deployed in network 306B. Wi-Fi devices are connected to one of the access points. Wi-Fi devices may include smartphones 310, laptop computers 312, tablets 314, smart glasses 316, metaverse devices (318A and 318B), and the like.

As shown in FIG. 3, metaverse device 318A is communicating with metaverse device 318B in a metaverse flow 326. Although FIG. 3 shows only one metaverse flow 326, there may be multiple metaverse flows supported by Wi-Fi optimization system 300. In this example, metaverse device 318A is connected with managed access point 304A in network 306A. Metaverse device 318B is connected with managed access point 304B in network 306B. Metaverse flow 326 between metaverse device 318A and metaverse device 318B is established through the managed access points (304A and 304B), Internet 128, and an application server 324. One of the challenges is that the packets that originate from one metaverse device should reach the other metaverse device with certain performance requirements, including latency, throughput, jitter, data rate, and the like. However, the Wi-Fi controllers (322A and 322B) may only control their respective managed access points (304A and 304B), but each may have no control over other devices involved in the flow, such as application server 324 and other devices on Internet 128.

In the present application, the improved techniques of Wi-Fi controllers (322A and 322B) in Wi-Fi optimization system 300 have many advantages. The system supports multiple metaverse flows. The system may be used to prioritize end-to-end metaverse flows, such that their performance requirements (KPIs or SLIs) are achieved. The Wi-Fi controllers optimize the performance of the system based on different constraints that are not only associated with the type of devices but also the different constraints that are associated with the applications that are running on those devices managed by the system. The performance requirements of the applications that are running on the devices managed by the system are collected by the system. The current performance of the applications are constantly being monitored by the system to determine whether their performance requirements are met. The different parameters are constantly being optimized by the system to achieve those performance requirements. For example, if a particular application running on a device has a certain maximum latency limit, and if the application's current latency is above the maximum latency limit, then the system may optimize the various parameters of the system to reduce the latency associated with the application while reducing the performance of the application in other aspects (e.g., by increasing its jitter) or reducing the performance of other devices that are running other applications (e.g., email downloading) that have less stringent performance requirements or do not have any KPI or SLI requirements.

In some embodiments, the Wi-Fi controllers (322A and 322B) are remote from their respective managed access points 304A and 304B. For example, the Wi-Fi controllers are cloud Wi-Fi controllers. As shown in FIG. 3, Wi-Fi controller 322A is connected to managed access point 304A via Internet 128. Similarly, Wi-Fi controller 322B is connected to managed access point 304B via Internet 128. However, it should be recognized that a Wi-Fi controller may also be integrated with its corresponding managed access point as a single device. Wi-Fi controller 322A may collect different information and data via managed access point 304A. For example, Wi-Fi controller 322A may collect from managed access point 304A the information corresponding to metaverse flow 326, including any metaverse application information (e.g., its performance requirements, such as its KPI or SLI) or any metaverse application flow performance statistics or metrics. Wi-Fi controller 322A may also collect from managed access point 304A any performance statistics or metrics corresponding to the various Wi-Fi devices in network 306A. Wi-Fi controller 322A may send control information to managed access point 304A, including any optimized parameter values for transmit power, user allocation, channel assignments, bandwidth assignments, beamforming, data rates, handover criteria, modulation schemes, error coding schemes, and the like.

As shown in FIG. 3, Wi-Fi controller 322A may be connected to an Internet service provider (ISP) network management device 320A via Internet 128. Similarly, Wi-Fi controller 322B may be connected to an Internet service provider (ISP) network management device 320B via Internet 128. ISP network management device 320A may receive ISP telemetry from managed access point 304A, and the ISP telemetry data may be sent to and collected by Wi-Fi controller 322A. The ISP telemetry data may include any performance statistics or metrics corresponding to the various Wi-Fi devices in network 306A.

Figure 4:
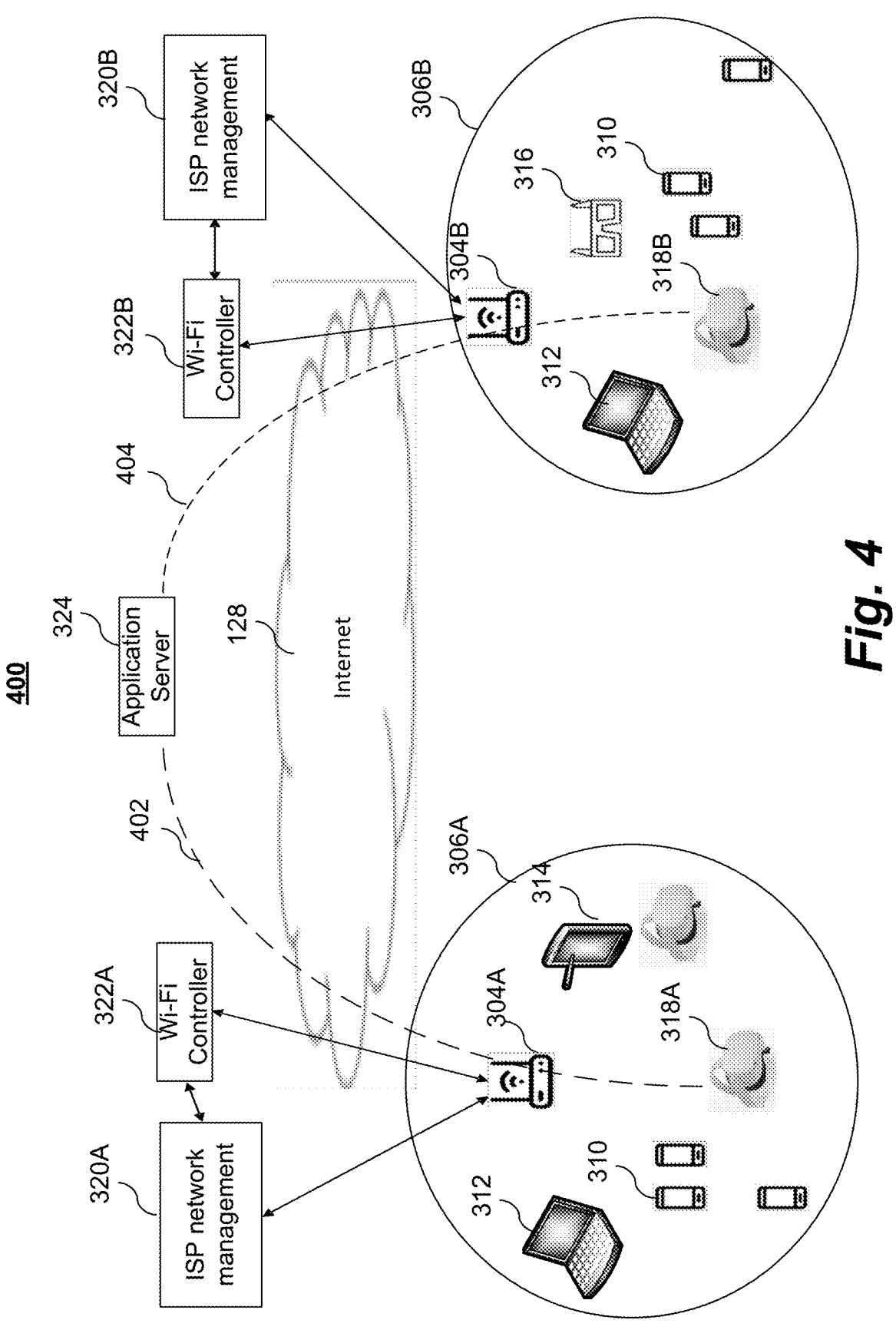
FIG. 4 illustrates another example of an improved Wi-Fi optimization system 400 for delivering data of Wi-Fi devices running applications that have more stringent performance requirements.

FIG. 4 illustrates another example of an improved Wi-Fi optimization system 400 for delivering data of Wi-Fi devices running applications that have more stringent performance requirements. Wi-Fi optimization system 400 is similar to Wi-Fi optimization system 300. In system 300 of FIG. 3, metaverse device 318A is communicating with metaverse device 318B in an end-to-end (or peer-to-peer) metaverse flow 326. For example, metaverse flow 326 is established between the two metaverse devices for a virtual reality online video game. In system 400 of FIG. 4, metaverse device 318A establishes a metaverse flow 402 with application server 324 via Internet 128. For example, metaverse flow 402 is established between metaverse device 318A and application server 324 for downloading streams of a live sports event. Similarly, metaverse device 318B establishes a metaverse flow 404 with application server 324 via Internet 128. For example, metaverse flow 404 is established between metaverse device 318B and application server 324 for downloading a 3D movie.

Some embodiments use a device (client) centric architecture, in which the metaverse device manages the end-to-end requirements and configures the AP behavior, while the Wi-Fi controller optimizes the various parameters based on the required QoS specifications. Some embodiments use a network centric architecture, in which the AP gathers the end-to-end requirements and configures the QoS policy, while the Wi-Fi controller optimizes the various parameters.

Some embodiments use a hybrid approach. There is no interaction needed between the application server and the AP. The metaverse device computes the end-to-end requirements and the measurements. The metaverse device sends the requirements to the AP, and the AP forwards the requirements to the Wi-Fi controller. The Wi-Fi controller may also determine the overall policy. This approach is similar to outer loop link adaptation. If one performance aspect of the metaverse application is insufficient to meet the specified requirement, then the system may optimize the parameters to improve and sustain the specified requirement. And if the performance aspect of the metaverse application meets the specified requirement with a sufficient margin, then the system may optimize the parameters to improve other performance aspects or improve other applications on the same device or on other devices in the network. For example, if a particular application running on a device has a certain maximum latency limit, and if the application's current latency is above the maximum latency limit, then the system may optimize the various parameters of the system to reduce the latency associated with the application while reducing the performance of the application in other aspects (e.g., by increasing its jitter) or reducing the performance of other devices that are running applications (e.g., email downloading) that have less stringent performance requirements or do not have any KPI or SLI requirements.

Figure 5:
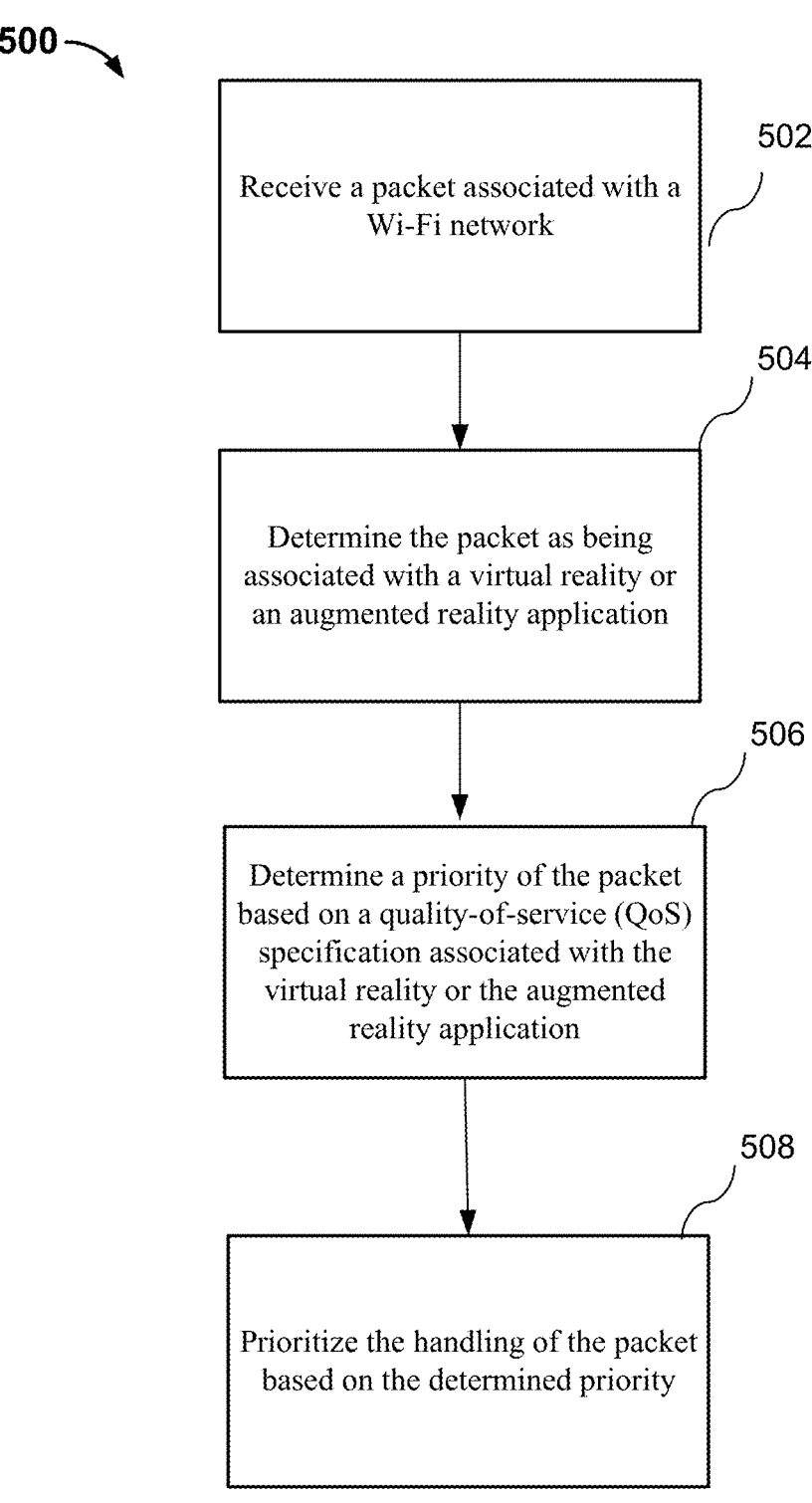
FIG. 5 illustrates an example of a process 500 for delivering data of Wi-Fi devices running applications that have more stringent performance requirements.

FIG. 5 illustrates an example of a process 500 for delivering data of Wi-Fi devices running applications that have more stringent performance requirements. In some embodiments, process 500 may be performed by at least some of the modules in Wi-Fi optimization systems 300 or 400, including managed access points (304A and 304B) and Wi-Fi controllers (322A and 322B).

At 502, a packet associated with a Wi-Fi network is received. With reference to FIG. 3, metaverse device 318A is connected with managed access point 304A in network 306A. Metaverse device 318B is connected with managed access point 304B in network 306B. And metaverse flow 326 between metaverse device 318A and metaverse device 318B is established through the managed access points (304A and 304B), Internet 128, and an application server 324. Upstream packets associated with metaverse flow 326 may be received by managed access point 304A from Wi-Fi network 306A. Downstream packets associated with metaverse flow 326 may be received by managed access point 304A, which may be sent to metaverse device 318A via network 306A.

With reference to FIG. 4, upstream packets associated with metaverse flow 402 are received by managed access point 304A from Wi-Fi network 306A, and upstream packets associated with metaverse flow 404 are received by managed access point 304B from Wi-Fi network 306B. Downstream packets associated with metaverse flow 402 may be received by managed access point 304A, which may be sent to metaverse device 318A via network 306A. Similarly, downstream packets associated with metaverse flow 404 may be received by managed access point 304B, which may be sent to metaverse device 318B via network 306B.

At 504, the packet is determined as being associated with a virtual reality or an augmented reality application. There are many ways to determine that a packet is associated with a particular application, such as a metaverse application. In some embodiments, the information that the packet is associated with a metaverse application may be sent by a metaverse device (e.g., in a device centric architecture) or the application server and the information is received by the managed access point and/or the Wi-Fi controller. This information may be exchanged in a standardized or proprietary protocol. In some embodiments, the protocol may be used to identify the metaverse device as a certain type of device, such as a virtual reality device or an augmented reality device. In some embodiments, the protocol may be used by the metaverse device or the application server to define the fields or identifiers in the packets for identifying the packets as being associated with the metaverse application. In one example, stream classification service (SCS) may be used to determine that a packet is associated with a particular application. SCS enables classification and Wi-Fi QoS treatment of specific IP flows, including flows to and from 5G core networks, allowing sensitive traffic such as gaming, voice, and video to be prioritized over bulk data traffic. The SCS is a supplementary service in which an access point (e.g., managed access point 304A) can give to linked stations (i.e., any Wi-Fi devices) to categorize multimedia streams based on subjective rules defined directly by the stations rather than the standard 802.1D user prioritization.

In some embodiments, the determination that the packet is associated with a metaverse application may be made by the managed access points and/or the Wi-Fi controllers. In some embodiments, the managed access points may determine that the packet is associated with a metaverse flow by inspecting certain fields of the packet. For example, the inspection may be a shallow packet inspection (SPI) or a deep packet inspection (DPI). In some embodiments, a metaverse flow may be identified based on one or more addresses of the packet, such as the media access control (MAC) address or the IP address of the packet. In some embodiments, a metaverse flow may be identified by a 5-tuple (source IP address, source TCP/UDP port, destination IP address, destination TCP/UDP port, and IP protocol), where TCP stands for Transmission Control Protocol, and UDP stands for User Datagram Protocol. The 5-tuple is gathered from the IP packet. The source IP address is located in the IP header of the packet. The destination IP address is located in the IP header of the packet. The IP protocol is the protocol in the IP header of the packet. If the protocol in an IP packet is TCP, the source port is the source port in the TCP header of the data portion of the packet. If the protocol in an IP packet is UDP, the source port is the source port in the UDP header of the data portion of the packet.

At 506, a priority of the packet is determined based on a quality-of-service (QoS) specification associated with the virtual reality or the augmented reality application. There are many ways to determine the QoS specification associated with the application.

In some embodiments, the quality-of-service (QoS) specification associated with the virtual reality or the augmented reality application may be sent by the metaverse devices (e.g., in a device centric architecture) or the application server, and the QoS specification is received by the managed access points and/or the Wi-controllers. This information may be exchanged in a standardized or proprietary protocol. In some embodiments, the protocol may be used by the metaverse device or the application server to define the QoS specification associated with the metaverse application. In some embodiments, SCS may be used to define the QoS specification associated with the metaverse application.

In some embodiments, the QoS specification may be determined based on the determined application associated with the packet found at step 504. For example, there may be a one-to-one mapping between the application and its QoS specification. The one-to-one mapping may be stored in a lookup table for looking up a QoS specification corresponding to the application.

The QoS specification is a set of performance requirements. For example, end-to-end service level indicators (SLIs) or key performance indicators (KPIs) may be used to evaluate whether the end-to-end performance requirements are met. A KPI is a metric, usually in the form of a counter or gauge value. The metric helps convey the health/status, performance, or usage of a given component or a set of related components. A service level indicator (SLI) is a metric that indicates what measure of performance a customer is receiving at a given time. SLIs are widely used by software development and operations (DevOps) engineers to discuss the quality of service (QoS) and create shared goals to promote reliability within a system. Common SLIs include latency, throughput, jitter, availability, and error rate; others include durability and correctness. For example, metaverse applications that require a high level of SLI include virtual reality online video games or cloud VR. Their minimum performance thresholds may include a goodput of 25 Mbps and an edge to device round-trip time (RTT) of 25 milliseconds (ms). Metaverse applications that require a medium level of SLI include cloud gaming and streaming applications. Their minimum performance thresholds may include a goodput of 10 Mbps and an edge to device round-trip time (RTT) of 50 ms. Metaverse applications that require a low level of SLI include video and VoIP. Their minimum performance thresholds may include a goodput of 5 Mbps and an edge to device round-trip time (RTT) of 125 ms. Metaverse applications may have different required SLIs/KPIs for uplink and downlink. A network that is capable of supporting metaverse applications should consistently deliver these minimum performance thresholds.

At 508, the handling of the packet is prioritized based on the determined priority. For example, the handling of the packets corresponding to a metaverse application with more demanding and stringent performance requirements is prioritized over the handling of the packets corresponding to other applications with less demanding and stringent performance requirements.

Figure 6:
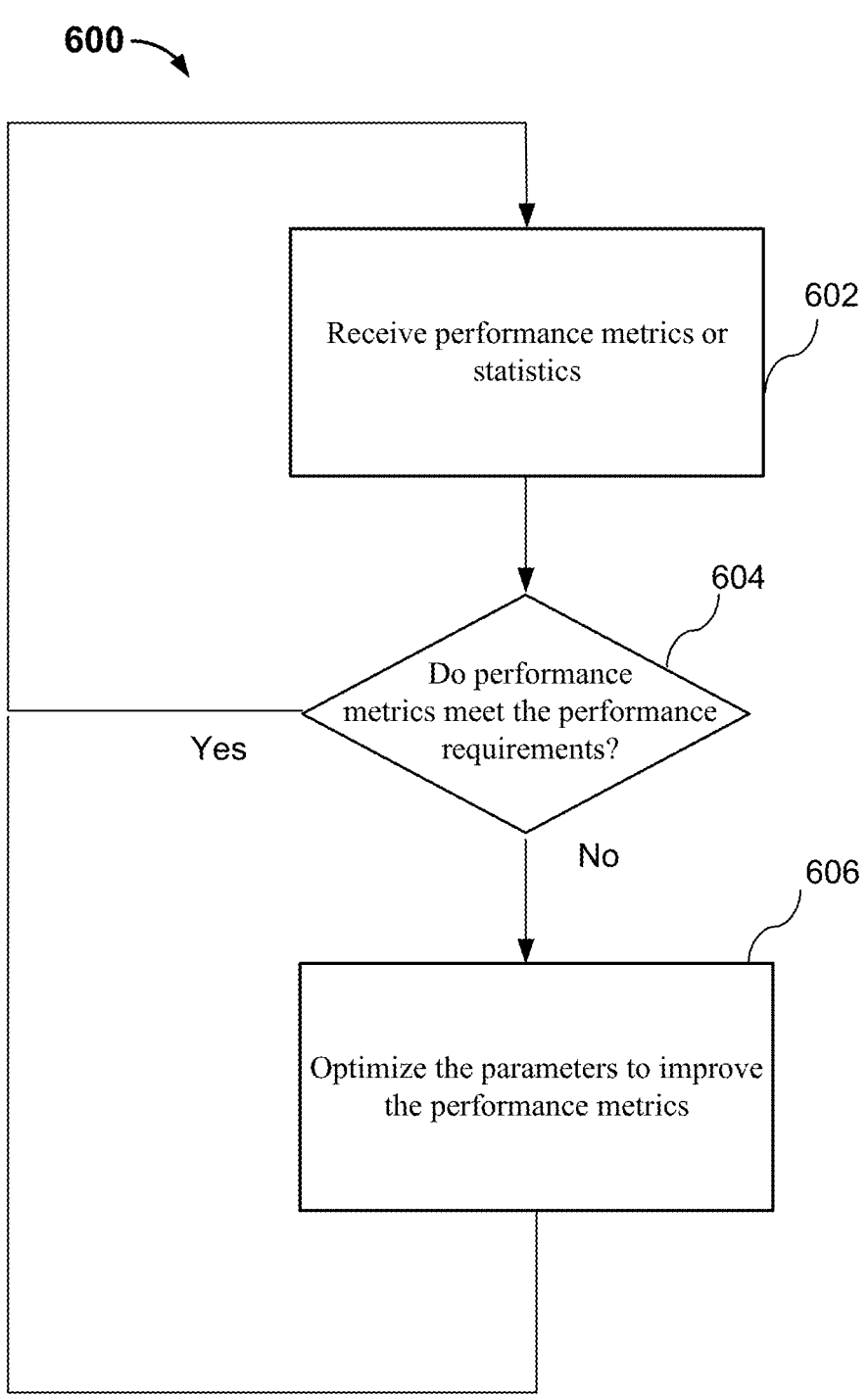
FIG. 6 illustrates an example process 600 for prioritizing the handling of packets associated with the virtual reality or the augmented reality application.

FIG. 6 illustrates an example process 600 for prioritizing the handling of packets associated with the virtual reality or the augmented reality application. In some embodiments, process 600 may be performed at step 508 of process 500 in FIG. 5. In some embodiments, the current levels of performance of the applications are constantly being monitored by the system to determine whether their performance requirements are met. The different parameters are constantly being optimized by the system to achieve those performance requirements. For example, if a particular application running on a device has a certain maximum latency limit, and if the application's current latency is above the maximum latency limit, then the system may optimize the various parameters of the system to reduce the latency associated with the application while reducing the performance of the application in other aspects (e.g., by increasing its jitter) or reducing the performance of other devices that are running applications (e.g., email downloading) that have less stringent performance requirements or do not have any KPI or SLI requirements.

At step 602, performance metrics or statistics are received. The QoS specification obtained at step 506 of process 500 in FIG. 5 is a set of performance requirements. Service level indicators (SLIs) or key performance indicators (KPIs) may be used to evaluate whether the performance requirements are met. Performance metrics may include latency, throughput, jitter, availability, and error rate; others include durability and correctness. Performance metrics may also include any measurements or indicators of the RF environment experienced by the Wi-Fi devices or the APs, including the spectrum conditions and usage, the strength of the signals that occupy the spectrum, the quality and performance of the connections, and the like. Performance metrics may include those corresponding to the metaverse device and its metaverse flow. Performance metrics may also include those corresponding to other Wi-Fi devices on the same Wi-fi network and the applications running on those other Wi-Fi devices.

With reference to FIG. 3, Wi-Fi controller 322A may collect different information and data via managed access point 304A. For example, Wi-Fi controller 322A may collect from managed access point 304A the information corresponding to metaverse flow 326, including any metaverse application flow performance statistics or metrics. Wi-Fi controller 322A may also collect from managed access point 304A any performance statistics or metrics corresponding to the various Wi-Fi devices in network 306A.

Wi-Fi controller 322A may collect different information and data via ISP network management device 320A. ISP network management device 320A may receive ISP telemetry from managed access point 304A, and the ISP telemetry data may be sent to and collected by Wi-Fi controller 322A. The ISP telemetry data may include any performance statistics or metrics corresponding to the various Wi-Fi devices in network 306A.

At step 604, it is determined whether the performance metrics meet the performance requirements. The QoS specification obtained at step 506 of process 500 in FIG. 5 is a set of performance requirements. The performance metrics obtained at step 602 may be used to evaluate whether the performance requirements are met. For example, a performance metric is compared against its corresponding performance requirement, and the performance metric is determined as meeting its corresponding performance requirement if the deficiency of the performance metric is within a predetermined threshold value. If all the performance requirements are met, then process 600 proceeds back to step 602 and the process is repeated. However, if at least one of the performance requirements is not met, then process 600 proceeds to step 606. For example, if the metaverse application has a certain maximum latency limit, and if the application's current latency is above the maximum latency limit, then process 600 proceeds to step 606.

At step 606, parameters are optimized to improve the performance metrics. After step 606 is performed, process 600 proceeds back to step 602 and the process is repeated. At step 606, the Wi-Fi controller may optimize the various parameters of the system to improve the performance metrics based on the comparison at step 604. For example, a performance metric associated with the metaverse application may be improved by trading off the performance of the metaverse application in another aspect, or by trading off the performance of other applications that have less stringent performance requirements, or by trading off the performance of other Wi-Fi neighboring devices (e.g., by reducing the power of the other Wi-Fi neighboring devices). Any system parameters that may improve the performance metrics of the metaverse applications may be tuned or optimized. For example, radio resource management (RRM) is the system level management of co-channel interference, radio resources, and other radio transmission characteristics in wireless communication systems, including wireless local-area networks. Radio resource management involves strategies and algorithms for controlling parameters such as transmit power, user allocation, channel assignments, band steering, bandwidth assignments, beamforming, data rates, handover criteria, modulation scheme, error coding scheme, and the like. The objective is to utilize the limited radio-frequency spectrum resources and radio network infrastructure as efficiently as possible to optimize the network performance, including increasing the data rate, reducing the interference, etc. In some embodiments, the parameters of the various devices in the Wi-Fi network are jointly optimized for optimal operation.

In some embodiments, parameters and features of orthogonal frequency-division multiple access (OFDMA) may be optimized and tuned. OFDMA is a technology in Wi-Fi 6 that improves wireless network performance by establishing independently modulating subcarriers within frequencies. This approach allows simultaneous transmissions to and from multiple clients. In some embodiments, parameters and features of multi-user multiple-input and multiple-output (MU-MIMO) may be optimized and tuned. MU-MIMO is a set of multiple-input and multiple-output (MIMO) technologies for multipath wireless communication, in which multiple users or terminals, each radioing over one or more antennas, communicate with one another. In some embodiments, parameters and features of link adaptation may be optimized and tuned. In some embodiments, contention window sizing may be optimized and tuned.

Figure 7:
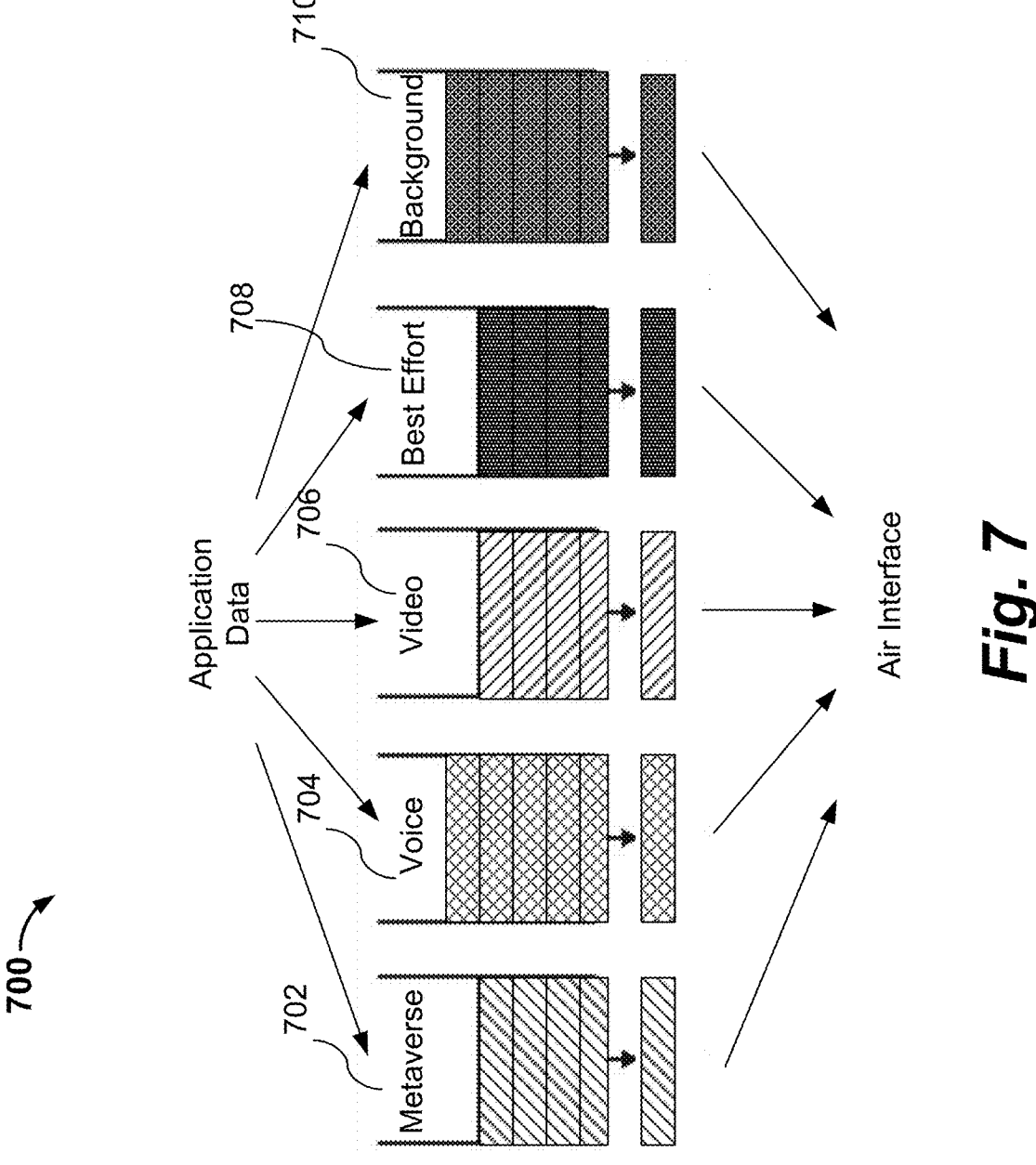
FIG. 7 illustrates an exemplary set of transmit queues 700 of a managed access point in the improved Wi-Fi optimization system 300 or the improved Wi-Fi optimization system 400.

FIG. 7 illustrates an exemplary set of transmit queues 700 of a managed access point in the improved Wi-Fi optimization system 300 or the improved Wi-Fi optimization system 400. As shown in FIG. 7, the set of queues 700 includes a queue for application data corresponding to each application classification, each having a different set of QoS specifications. Queue 702 is a highest priority queue dedicated to metaverse application data. Queue 704 is a queue for voice data. Queue 706 is a queue for video data. Queue 708 is a queue for best effort applications. Queue 710 is a queue for background data. Data frames are mapped to the corresponding application classification, and the data frames are assigned to the corresponding transmit queue. After any internal collisions are resolved, the data frames from the different queues may be sent to the air interface for transmission.

Figure 8:
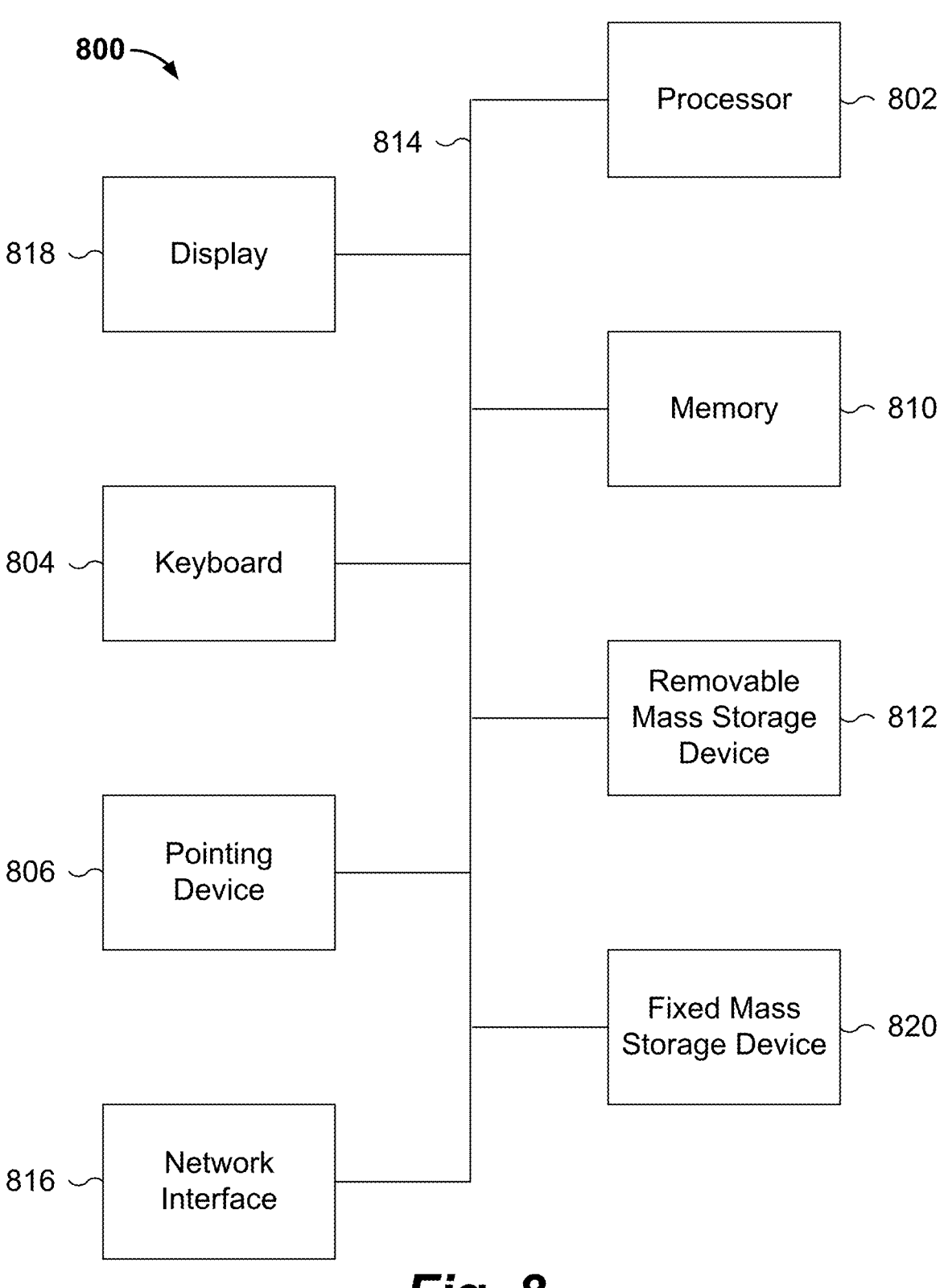
FIG. 8 is a functional diagram illustrating a programmed computer system for executing some of the processes in accordance with some embodiments.

FIG. 8 is a functional diagram illustrating a programmed computer system for executing some of the processes in accordance with some embodiments. As will be apparent, other computer system architectures and configurations can be used as well. Computer system 800, which includes various subsystems as described below, includes at least one microprocessor subsystem (also referred to as a processor or a central processing unit (CPU)) 802. For example, processor 802 can be implemented by a single-chip processor or by multiple processors. In some embodiments, processor 802 is a general purpose digital processor that controls the operation of the computer system 800. Using instructions retrieved from memory 810, the processor 802 controls the reception and manipulation of input data, and the output and display of data on output devices (e.g., display 818). In some embodiments, processor 802 includes and/or is used to execute/perform processes 500 and 600 described above with respect to FIGS. 5 and 6.

Processor 802 is coupled bi-directionally with memory 810, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 802. Also as is well known in the art, primary storage typically includes basic operating instructions, program code, data and objects used by the processor 802 to perform its functions (e.g., programmed instructions). For example, memory 810 can include any suitable computer-readable storage media, described below, depending on whether, for example, data access needs to be bi-directional or uni-directional. For example, processor 802 can also directly and very rapidly retrieve and store frequently needed data in a cache memory (not shown).

A removable mass storage device 812 provides additional data storage capacity for the computer system 800 and is coupled either bi-directionally (read/write) or uni-directionally (read only) to processor 802. For example, storage 812 can also include computer-readable media such as magnetic tape, flash memory, PC-CARDS, portable mass storage devices, holographic storage devices, and other storage devices. A fixed mass storage 820 can also, for example, provide additional data storage capacity. The most common example of mass storage 820 is a hard disk drive. Mass storages 812, 820 generally store additional programming instructions, data, and the like that typically are not in active use by the processor 802. It will be appreciated that the information retained within mass storages 812 and 820 can be incorporated, if needed, in standard fashion as part of memory 810 (e.g., RAM) as virtual memory.

In addition to providing processor 802 access to storage subsystems, bus 814 can also be used to provide access to other subsystems and devices. As shown, these can include a display monitor 818, a network interface 816, a keyboard 804, and a pointing device 806, as well as an auxiliary input/output device interface, a sound card, speakers, and other subsystems as needed. For example, the pointing device 806 can be a mouse, stylus, track ball, or tablet, and is useful for interacting with a graphical user interface.

The network interface 816 allows processor 802 to be coupled to another computer, computer network, or telecommunications network using a network connection as shown. For example, through the network interface 816, the processor 802 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 802 can be used to connect the computer system 800 to an external network and transfer data according to standard protocols. For example, various process embodiments disclosed herein can be executed on processor 802 or can be performed across a network such as the Internet, intranet networks, or local area networks, in conjunction with a remote processor that shares a portion of the processing. Additional mass storage devices (not shown) can also be connected to processor 802 through network interface 816.

An auxiliary I/O device interface (not shown) can be used in conjunction with computer system 800. The auxiliary I/O device interface can include general and customized interfaces that allow the processor 802 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 8 is but an example of a computer system suitable for use with the various embodiments disclosed herein. Other computer systems suitable for such use can include additional or fewer subsystems. In addition, bus 814 is illustrative of any interconnection scheme serving to link the subsystems. Other computer architectures having different configurations of subsystems can also be utilized.

Although the foregoing embodiments have been described in some detail for purposes of clarity of understanding, the disclosure is not limited to the details provided. There are many alternative ways of implementing the disclosure. The disclosed embodiments are illustrative and not restrictive.

What is claimed is:

1. A method, comprising:
receiving a packet associated with a Wi-Fi network;
determining that the packet is associated with a virtual reality or an augmented reality application;
determining a priority of the packet based on a quality-of-service (QOS) specification associated with the virtual reality or augmented reality application;
prioritizing handling of the packet based on the determined priority;
receiving performance metrics or statistics associated with the virtual reality or augmented reality application;
comparing the received performance metrics or statistics associated with the virtual reality or augmented reality application with the QoS specification associated with the virtual reality or augmented reality application to obtain a set of comparison results; and
jointly optimizing a plurality of parameters associated with the Wi-Fi network to improve the performance metrics or statistics associated with the virtual reality or augmented reality application at least in part based on the set of comparison results, wherein the plurality of parameters comprises radio resource management parameters.

2. The method of claim 1, further comprising:
receiving information that the packet is associated with the virtual reality or augmented reality application from a Wi-Fi device executing the virtual reality or augmented reality application; and
receiving the QoS specification associated with the virtual reality or augmented reality application from the Wi-Fi device executing the virtual reality or augmented reality application.

3. The method of claim 2, wherein the received information identifies one or more fields or one or more identifiers in the packet for identifying the packet as being associated with the virtual reality or augmented reality application.

4. The method of claim 1, further comprising:
determining that the packet is associated with the virtual reality or augmented reality application based on stream classification service (SCS); and
determining the QoS specification associated with the virtual reality or augmented reality application based on the SCS.

5. The method of claim 1, further comprising:
determining that the packet is associated with the virtual reality or augmented reality application by inspecting one or more fields of the packet.

6. The method of claim 5, wherein the one or more fields of the packet comprises a media access control (MAC) address or an Internet Protocol (IP) address.

7. The method of claim 5, wherein the one or more fields of the packet comprises a 5-tuple that comprises a source Internet Protocol (IP) address, a source port, a destination IP address, a destination port, and an IP protocol, wherein the source port is a source Transmission Control Protocol (TCP) port or a source User Datagram Protocol (UDP) port, and wherein the destination port is a destination TCP port or a source UDP port.

8. The method of claim 1, further comprising:
determining the QoS specification associated with the virtual reality or augmented reality application based on a set of mappings that map one or more types of applications to one or more corresponding QoS specifications.

9. The method of claim 1, wherein the QoS specification comprises a set of end-to-end performance requirements, and wherein end-to-end service level indicators (SLIs) or key performance indicators (KPIs) are used to evaluate whether the end-to-end performance requirements are met.

10. The method of claim 1, further comprising:
receiving performance metrics or statistics associated with one or more other Wi-Fi devices in the Wi-Fi network; and
jointly optimizing the plurality of parameters associated with the Wi-Fi network to improve the performance metrics or statistics associated with the virtual reality or augmented reality application at least in part based on the received performance metrics or statistics associated with the one or more other Wi-Fi devices in the Wi-Fi network.

11. A system, comprising:
a processor configured to:
receive a packet associated with a Wi-Fi network;
determine that the packet is associated with a virtual reality or an augmented reality application;
determine a priority of the packet based on a quality-of-service (QOS) specification associated with the virtual reality or augmented reality application;
prioritize handling of the packet based on the determined priority;
receive performance metrics or statistics associated with the virtual reality or augmented reality application;
compare the received performance metrics or statistics associated with the virtual reality or augmented reality application with the QoS specification associated with the virtual reality or augmented reality application to obtain a set of comparison results; and
jointly optimize a plurality of parameters associated with the Wi-Fi network to improve the performance metrics or statistics associated with the virtual reality or augmented reality application at least in part based on the set of comparison results, wherein the plurality of parameters comprises radio resource management parameters; and memory coupled to the processor and configured to provide the processor with instructions.

12. The system of claim 11, wherein the processor is configured to:

receive information that the packet is associated with the virtual reality or augmented reality application from a Wi-Fi device executing the virtual reality or augmented reality application; and receive the QoS specification associated with the virtual reality or augmented reality application from the Wi-Fi device executing the virtual reality or augmented reality application.

13. The system of claim 11, wherein the processor is configured to:

determine that the packet is associated with the virtual reality or augmented reality application by inspecting one or more fields of the packet.

14. The system of claim 11, wherein the QoS specification comprises a set of end-to-end performance requirements, and wherein end-to-end service level indicators (SLIs) or key performance indicators (KPIs) are used to evaluate whether the end-to-end performance requirements are met.

15. The system of claim 11, wherein the processor is configured to:

receive performance metrics or statistics associated with one or more other Wi-Fi devices in the Wi-Fi network; and jointly optimize the plurality of parameters associated with the Wi-Fi network to improve the performance metrics or statistics associated with the virtual reality or augmented reality application at least in part based on the received performance metrics or statistics associated with the one or more other Wi-Fi devices in the Wi-Fi network.

16. A computer program product embodied in a non-transitory computer readable medium and comprising computer instructions for:

receiving a packet associated with a Wi-Fi network;

determining that the packet is associated with a virtual reality or an augmented reality application;

determining a priority of the packet based on a quality-of-service (QOS) specification associated with the virtual reality or augmented reality application;

prioritizing handling of the packet based on the determined priority;

receiving performance metrics or statistics associated with the virtual reality or augmented reality application;

comparing the received performance metrics or statistics associated with the virtual reality or augmented reality application with the QoS specification associated with the virtual reality or augmented reality application to obtain a set of comparison results; and jointly optimizing a plurality of parameters associated with the Wi-Fi network to improve the performance metrics or statistics associated with the virtual reality or augmented reality application at least in part based on the set of comparison results, wherein the plurality of parameters comprises radio resource management parameters.

17. The computer program product of claim 16, further comprising computer instructions for:

receiving performance metrics or statistics associated with one or more other Wi-Fi devices in the Wi-Fi network; and jointly optimizing the plurality of parameters associated with the Wi-Fi network to improve the performance metrics or statistics associated with the virtual reality or augmented reality application at least in part based on the received performance metrics or statistics associated with the one or more other Wi-Fi devices in the Wi-Fi network.

* * * * *